L. LOZIANO.

RADIATOR.

APPLICATION FILED JULY 15, 1911.

Reissued Apr. 30, 1912. 13,411.

Witnesses:

John L. Lotsch

Geo. J. Hanson

Inventor

Leon Loziano

By Dyer Dyer & Taylor

Attorneys.

UNITED STATES PATENT OFFICE.

LEON LOZIANO, OF PARIS, FRANCE, ASSIGNOR, BY MESNE ASSIGNMENTS, TO SOCIETE ANONYME MONTBARBON, OF NEUILLY-SUR-SEINE, FRANCE, A CORPORATION OF FRANCE.

RADIATOR.

13,411. Specification of Reissued Letters Patent. Reissued Apr. 30, 1912.

Original No. 944,450, dated December 28, 1909, Serial No. 400,314. Application for reissue filed July 15, 1911. Serial No. 638,787.

*To all whom it may concern:*

Be it known that I, LEON LOZIANO, a citizen of the Republic of France, residing at Paris, in France, have invented certain new and useful Improvements in Radiators, of which the following is a specification.

This invention relates to an improved construction of honey-combed radiators of the type in which tubes are formed by corrugated or plaited sheet metal.

The radiator constructed according to this invention comprises wires passed through holes provided near the edge of the metal sheets in order to connect the latter together to form conduits of uniform width between the same, to accurately locate the solder or the like with which the sealing of the ends of the conduits formed by the assembled sheets is effected, and to determine the distance between such sheets during their assemblage.

Figure 1:
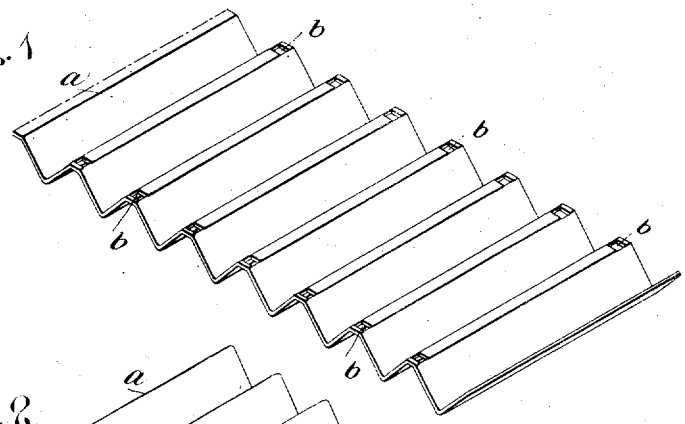
Figure 2:
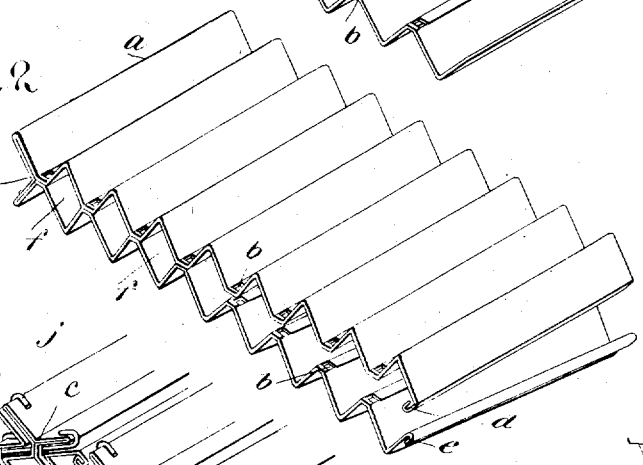
Figure 3:
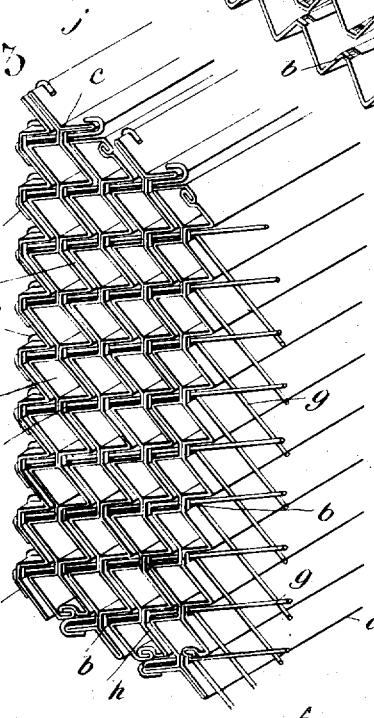
Figure 4:
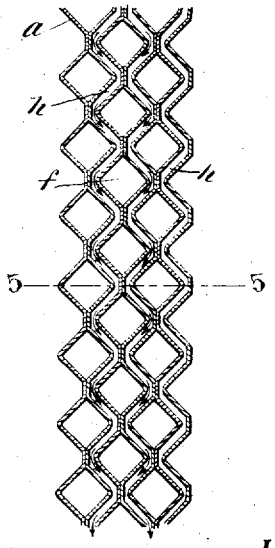
Figure 5:
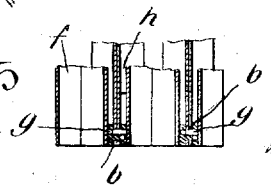

In the accompanying drawings:—Figure 1 shows in perspective the shape of the constituent elements of the radiator. Fig. 2 is a perspective view of one of the elements in the course of construction. Fig. 3 shows in perspective, also in the course of construction, the radiator, several elements of which have already been fitted up. Fig. 4 is a section of the radiator showing the conduits or flues for the gaseous and liquid currents, and Fig. 5 is a section on the line 5—5 of Fig. 4.

The radiator consists of a series of elements of cell shape, constituted by metal sheets *a* of the necessary dimensions and having the cross-section shown in Fig. 1, so as to form a series of folds or creases at a suitable angle, for instance, at a right angle. Those of the creases thus formed which are situated on one and the same side of the sheet are preferably flattened out, so as to take off the sharp edge of the ridge and are provided on the flat portion, when such flat portion is made, with holes *b* situated at a few millimeters from each edge of the sheet.

The sheets thus prepared are arranged two and two, one against the other, so that the edges which are provided with the holes *b*, and are preferably flattened out, should be in contact, or as shown in Fig. 2, a sheet of sufficient length is folded at *c* about itself, the free edges *d* and *e* being subsequently hooked together, thus forming a series of conduits *f* having the shape of a parallelepiped. The elements thus constituted are engaged with each other, as shown in Fig. 3, the flattened ridges of one element being near the sharp angles of the element immediately adjoining it. The connection of the elements thus constituted is then effected by means of sewing, by means of pins or wires *g* which, being arranged parallel to the sides of the parallelepipeds *f*, engage with the holes *b* of the sheets *a*, a uniform distance thus being reserved between the adjoining elements, equal to the diameter of the said wires *g*, each hole *b* being of sufficient size to enable two wires to pass side by side through the hole *b*. The wires are in two series, crossing one another as shown, producing a cross wire arrangement. When a sufficient number of elements are fitted together to form a desired active surface, the free ends of the wires *g* are secured in any suitable way, as by being bent, as shown at *i* and *j* (Fig. 3) and thus a series of cells is obtained, connected together rigidly and in a permanent manner, without the need of an extraneous framework. It only remains then to close the spaces *h* on the front and back faces of the radiator, which is effected in the usual manner by dipping the block, at a right angle to its two faces and to a depth of about 1 cm. into a bath of molten tin, so that the molten metal fills them up to that height. The sewing wires *g* are inclosed by the tin and thus form with the elements constituted by sheets *a* an absolutely homogeneous and air-tight whole. The fluid which circulates in the radiator, will pass through the spaces *h* thus reserved between each element, and will be divided, as shown in Fig. 4, into thin veins which will follow the corrugations of the sheets *a*. Each vein following a distinct path independent from that of the other veins, the fluid becomes quickly cooled by contact with the air entering the parallelepiped passages *f*, the exchange of heat being more effectual the thinner the separating partitions *a*. This is a result which could not be obtained by tubes joined together which must necessarily have a greater thickness.

A radiator thus constituted is absolutely rigid owing to the use of the network of the wires *g* which brace and sew together the adjoining cell elements constituted by the sheets *a*, and thus prevent any play or deformation of the said sheets, so that any strain on the front and back soldering is avoided and a permanent structure is produced. The solder serving mainly to keep the water in, and not to fasten the parts together, a softer and consequently a cheaper solder can be employed, than would be the case if the wires were not used as has been herein described. The radiator is entirely air-tight, owing to the soldering which is perfectly supported by the connecting wires *g*. It offers the least resistance to the circulation of the fluid as, owing to the wires *g*, the discharge sections are strictly uniform in section. It insures a perfect and quick action owing to the circulation of the fluid in thin layers independent of each other, not subjected to any division and brought into contact with large surfaces of metal, the heat exchange being the quicker and the more effectual, the smaller the thickness of the constituent sheets *a* of the elements.

The radiators thus formed can be used either as radiators for motor car engines, or as radiators for heating, refrigerating, or for any purpose where it is desired to obtain exchange of heat between two fluids.

What I claim as my invention and desire to secure by Letters Patent is:—

1. A honey-comb radiator comprising metal sheets bent in zig-zag form and having superposed angles, with holes in the angles, and wires passing cross-wise through the holes of the contiguous angles of the said sheets.

2. A honey-comb radiator comprising metal sheets bent in zig-zag form and having superposed angles, with holes in the angles, wires passing cross-wise through the holes of the contiguous angles of the said sheets, and means for securing the ends of the wires.

3. A honey-comb radiator comprising metal sheets bent in zig-zag form and having superposed angles and wires *g* passing cross-wise through the holes *b* of the contiguous angles of the said sheets, the ends *i*, *j*, of said wires being bent.

4. A honey-comb radiator formed of zig-zag sheets sewed together by cross wires, said wires passing through holes in the sheets.

5. A honey-comb radiator formed of sheets of metal bent to zig-zag form, with holes near the edges and located in the angles, two sets of cross wires passing through the holes, the crossing of wires of the two sets being located within a hole.

6. A honey-comb radiator formed of sheets of metal bent to zig-zag form, and having superposed angles, openings at the angles, cross wires passing through said openings, and supported solely by the sheets and partly or wholly closing the ends of the spaces between the sheets.

7. A honey-comb radiator formed of sheets of metal bent to zig-zag form, and having superposed angles, cross wires passing through holes in the sheets, and holding them together without extraneous support.

8. A honeycomb radiator formed of sheets of metal bent to zigzag shape and having superposed angles, said sheets having openings, wires crossing at an angle between the sheets and passing through the openings, and solder closing the ends of the spaces between sheets.

In testimony whereof I have signed my name to this specification in the presence of two subscribing witnesses.

LEON LOZIANO.

Witnesses:
H. C. Coxe,
Louis Remy.